United States Patent [19]

Benham

[11]  4,395,498
[45]  Jul. 26, 1983

[54] HIGH TEMPERATURE PHENOLIC RESINS AND FRICTION ELEMENTS PREPARED THEREFROM

[75] Inventor: Judith L. Benham, Stillwater, Minn.

[73] Assignee: Minnesota Mining and Manufacturing Company, St. Paul, Minn.

[21] Appl. No.: 303,554

[22] Filed: Sep. 18, 1981

[51] Int. Cl.³ .............................................. C08G 14/04
[52] U.S. Cl. .................................... 523/158; 525/492; 525/501.5; 528/1; 528/160
[58] Field of Search .......................... 260/19 R, 19 N; 525/492; 528/1, 2, 3, 160; 523/158

[56] References Cited

U.S. PATENT DOCUMENTS

| | | | |
|---|---|---|---|
| 2,330,827 | 10/1943 | Kester | 528/160 |
| 2,339,271 | 1/1944 | Kester | 528/160 |
| 2,954,360 | 9/1960 | Krzikalla et al. | 260/43 |
| 3,290,271 | 12/1966 | O'Brochta | 528/160 |
| 3,406,132 | 10/1968 | Winegartner | 528/160 |
| 3,920,594 | 11/1975 | Sato | 260/19 R |
| 3,947,393 | 3/1976 | Sato | 260/19 N |
| 4,096,108 | 6/1978 | Webb et al. | 260/38 |
| 4,110,279 | 8/1978 | Nelson et al. | 260/19 |

FOREIGN PATENT DOCUMENTS

| | | |
|---|---|---|
| 720034 | 3/1952 | United Kingdom . |
| 720035 | 3/1952 | United Kingdom . |
| 767385 | 3/1955 | United Kingdom . |
| 840320 | 12/1956 | United Kingdom . |
| 1531668 | 7/1977 | United Kingdom . |

Primary Examiner—Paul R. Michl
Attorney, Agent, or Firm—Cruzan Alexander; Donald M. Sell; Lorraine R. Sherman

[57] ABSTRACT

High temperature phenolic resins suited for use for example in an automotive or similar brake or in a clutch, are provided by a blend of the reaction product of a phenolic compound, naphthalenic compound, and formaldehyde with selected prior art resins. The mole ratio range of naphthalenic compound: phenolic compound: formaldehyde is about 1: 0.8-5: 1-10. Friction particles and friction elements can be prepared from said reaction product optionally being blended with said selected prior art resins. An improved method of making friction elements is also provided which uses such binder.

18 Claims, No Drawings

HIGH TEMPERATURE PHENOLIC RESINS AND FRICTION ELEMENTS PREPARED THEREFROM

DESCRIPTION

1. Technical Field

This invention relates to a binder resin comprising the reaction product of a phenolic compound, a naphthalenic compound, and formaldehyde, said product optionally being blended with known prior art resins such as bodied cashew nut shell liquid resin, bodied linseed oil resin, or oil-modified phenolic resin. In another aspect, it relates to friction particles and improved friction elements containing said binder resin. In a further aspect, it relates to a method of making a friction element employing such a binder.

2. Background Art

Various mechanical devices which are movable or have movable parts utilize frictional forces to transmit, slow or stop motion. This is accomplished by contacting a moving part with an immobilized part until the frictional forces between the contacting parts cause the moving part to slow sufficiently or to stop. Such devices are customarily referred to as brakes. A clutch on the other hand utilizes such frictional forces for engaging and disengaging movable parts.

Brakes for vehicles are of two main types, "disc" brakes and "drum" brakes. Disc brakes employ a disc or a plate located on the inboard face of a wheel and have positioned on opposite sides of the disc non-rotating brake shoes fitted on their contacting surfaces with friction pads of brake lining material. Mechanical or hydraulic linkages are provided to force the friction pads into engagement with the rotating disc and to release such engagement.

Drum brakes utilize non-rotating brake shoes having generally curved friction pads or brake linings on their surfaces which are forced into engagement with a brake drum which rotates with the wheel. The shoes are mechanically or hydraulically forced against the drum when appropriate braking force is applied. In each case, the normal position of the friction pad is that of being disengaged from the drum or disc.

The surface contacted by the brake lining is typically a hard, smooth, essentially non-wearing part, customarily made of steel, cast iron or aluminum. The friction pad is somewhat softer than the surface which it contacts, more resilient and adapted to provide the appropriate frictional surface. Such pads are typically replaceable and generally slowly wear away so they must be periodically replaced.

The necessary performance characteristics of the brake lining material forming such friction elements include dimensional stability, a relatively constant frictional level as temperature is varied since heat is always generated in the braking operation, low lining wear and minimum wear of the brake drum or disc against which it is applied.

Such friction elements are generally formed of a fibrous thermally stable reinforcing material, various metallic or non-metallic powdered or particulate solid filler materials and a binder resin to hold the mass together. For the purpose of this application the ingredients contained in the friction elements other than the binder shall be referred to as "filler". This term is intended to include such conventional ingredients as particulate or powdered friction material; powdered, particulate or fibrous reinforcing materials; additives to assist in the dissipation of heat; and the like. The binder typically comprises about 5% to about 25% of the friction element with the balance of 95% to 75% being such filler.

There are two popular processes currently employed for the manufacture of such friction elements. The first involves mixing a powdered solid reactive cross-linkable B-stage binder resin with the requisite filler and optionally a suitable curative in a mixing device such as a blender. (Such curatives are compounds or mixtures which provide a reactive species to cross-link or cause cross-linking of the resin. Commonly used curatives include sulfur and formaldehyde donor compounds, such as hexamethylene tetramine or paraformaldehyde.) The mix, which is loose and pourable, is first pre-formed and then transferred to a mold having a cavity of the appropriate size and shape wherein the mixture is heated and pressed until the binder resin flows to coat the filler and then cures producing a mass which may be machined, if required, to the appropriate shape.

The second process utilizes a liquid resin binder, dissolved in a suitable solvent, if required, which is mixed with the desired filler and curative, if needed, in a mixer to provide a homogenous doughy mass. The mass is then processed into the appropriate shape by extrusion or roll molding to produce an uncured, or "green", shape which is dried to remove solvent, if used, then heated in an unconfined state to cure the binder.

Brake linings made with presently available liquid binders suffer some shortcomings. The major problem is a loss of effectiveness upon continuous heavy use of the brake, called "fade". This problem is apparent to the operator of a motor vehicle as an increase in the amount of pedal effort needed to slow or stop the vehicle. Fade is typically traceable to a decrease in the coefficient of friction as the brake linings absorb the heat of repeated stops, forcing the lining temperature higher and higher. This shortcoming leads to unpredictable and unsafe operating conditions. Laboratory testing of the brake linings made from such conventional resins confirm that they exhibit low friction at high temperature. In some cases, the coefficient of friction drops below 0.2 at temperatures as low as 345° C. Useful coefficients of friction for friction elements are in the range of 0.2 to 0.8. Bodied cashew nut shell liquid resin has useful friction properties, but it is only stable up to temperatures of about 370° C.

There are three main types of liquid binder resins presently utilized in the second process to produce the majority of brake linings. The first type is based on linseed oil which has been "bodied", i.e., modified to increase its molecular weight and viscosity. Such modification is typically carried out by heating the linseed oil in the presence of oxygen and/or a catalyst, causing some of the oil molecules to link together to form a cross-linkable reactive resin containing unsaturation which is curable in the presence of a sulfur curative. The second type liquid resin is based upon cashew nut shell liquid (hereinafter sometimes referred to as "CNSL") which has been "bodied" by heating in the presence of a strong acid. This results in a resin which contains both carbon-carbon unsaturation curable with sulfur or sulfur-containing compounds and reactive phenolic groups curable with formaldehyde donor compounds such as hexamethylene tetramine (commonly known as "Hexa"). The third type of binder liquid is an oil-modified phenolic resin which is prepared by condensation of phenol with various vegetable oil materials which soften and solubilize otherwise hard and insoluble phenolic resins.

Some of the binder resins disclosed herein are taught in British Patent Specifications Nos. 720,034, 720,035, 767,385, 1,531,668, and 840,320 as being useful in lacquers, in non-corrosive apparatus compositions, in puttying and plastering compositions, as a resin base for paints, and as compression-molding compositions and heat-resistant glass and carbon plastics, respectively. U.S. Pat. No. 2,954,360 is a U.S. counterpart of the British Patent Specification No. 720,035. These patents fail to disclose the use of these resins in friction elements.

Additionally, U.S. Pat. No. 4,110,279 discloses high temperature polymers from methoxy functional aromatic ether monomers prepared by reacting:

I. a reaction product of a diaryl compound (which can be naphthalene), formaldehyde, water, and a hydroxy aliphatic hydrocarbon, II. at least one monomeric phenolic reactant, and III. optionally, an aldehyde or ketone. U.S. Pat. No. 4,110,279 suggests that these polymers have use as laminating, molding, film-forming, and adhesive materials. U.S. Pat. No. 4,096,108 teaches the preparation of a frictional material using as a binder a resin made from the reaction product ingredient (I) of aforementioned U.S. Pat. No. 4,110,279 reacted with a phenolic compound and formaldehyde in the presence of an acid catalyst. The method of preparation differs and it appears that the cured resin differs from that of the present invention.

DISCLOSURE OF INVENTION

The present invention provides a binder resin composition comprising a physical blend of:

1. 10 to 95 weight percent, based on resin solids, of a curable naphthalenic/phenolic/formaldehyde resin (hereinafter sometimes referred to as "n/p/f resin") which is the reaction product of:

a. at least one phenolic compound having the formula

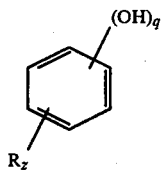

wherein each R independently represents an aliphatic group of 1 to 20 carbon atoms or an aryl group having 6 to 12 carbon atoms, q is 1, 2 or 3, and z is 0, 1, or 2;

b. at least one naphthalenic compound having the formula

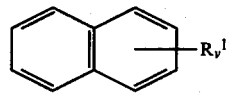

wherein each $R^1$ independently is a halo or an aliphatic group of 1 to 15 carbon atoms, and v is 0, 1, 2, or 3, and c. formaldehyde;

the mole ratio of naphthalenic compound:phenolic compound:formaldehyde in the resin is in the range of 1:0.8–5:1–10, preferably 1:1–3:1–5, and most preferably 1:1–2:1–4, and 2. 5 to 90 weight percent, based on curable binder resin solids, of prior art resins selected from bodied cashew nut shell liquid resin, bodied linseed oil resin, and oil-modified phenolic resins, and mixtures thereof, and 3. 5 to 10 weight percent, based on curable binder resin solids, of formaldehyde donor compounds.

By "aliphatic" is meant a straight or branched chain hydrocarbon containing single and optionally double bonds.

CNSL is composed mainly of the phenolic compound,

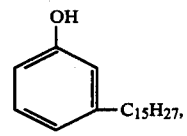

wherein $C_{15}H_{27}$ is an alkenyl group with an average of two unsaturated sites. Minor proportions of polymeric aromatics as well as the resorcinolic compound,

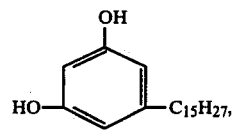

wherein $C_{15}H_{27}$ is as defined above, are generally present.

Bodied CNSL resin is a product derived by heating cashew nut shell liquid to 70°–120° C. in the presence of a strong acid, as is known in the art.

Bodied linseed oil and oil-modified phenolic resins are described above.

The ingredients and ratios thereof are selected to provide a solid or liquid resin, either of which may be dispersed alone or as a mixture in a compatible solvent. The liquid binder resin has a viscosity not exceeding about 100,000 cps at 25° C. at no less than about 60% nonvolatile content, preferably not exceeding 70,000 cps at 25° C. at no less than about 75% nonvolatile content.

The present invention also provides friction particles, filled or unfilled, which can be prepared from the blended binder resin or unblended n/p/f resin in the presence of an appropriate formaldehyde donor compound (e.g., paraformaldehyde) as curative agent. Additionally, the present invention provides a friction element which comprises conventional filler materials, i.e. reinforcing fillers, friction particles, heat dissipating additives and the like, and employs the blended binder resin or unblended n/p/f resin disclosed above. The aforementioned naphthalenic/phenolic/formaldehyde resin is present in friction particles or friction elements in the range of 10 to 100 weight percent, based on curable resin solids, and the prior art resins are present in the range of 0 to 90 weight percent, based on curable resin solids.

While it is believed that friction elements or particles containing the blended binder resin or unblended n/p/f resin defined above are not known or obvious in the art, that is not the case with the n/p/f resin per se as broadly defined in view of the disclosure of British Patent Specifications Nos. 720,034, 720,035, 767,385, 1,531,668, and 840,320. Binder resin compositions which are physical blends of the aforementioned naphthalenic/phenolic/-formaldehyde resin with prior art resins selected from bodied cashew nut shell liquid resin, bodied linseed oil resin, and oil-modified phenolic resin are also novel and not obvious in view of the prior art.

DETAILED DESCRIPTION OF THE INVENTION

The ingredients selected to form the binder resins for the friction material of the invention are readily availble. Formaldehyde, which is a gas under ambient conditions, is employed in commercially available liquid or solid forms. One available solid source of formaldehyde is paraformaldehyde which is a 91–93% active polymer of formaldehyde typically having a molecular weight on the order of 500 to 2000 with the balance being water. This material will depolymerize under the reaction conditions herein described to release formaldehyde to facilitate the reaction to produce the binder. The formaldehyde may also be introduced as a formaldehyde solution in water available in a form commercially identified as "Formalin" which typically contains on the order of 37 to 51% by weight formaldehyde.

Commercially available technical grade phenols (as used herein "phenols" or "phenolic compound" also includes di- or trihydroxy benzenes) may be employed without any purification steps to produce the defined resin binder. Cashew nut shell liquid (CNSL) is commercially available and may be used without further purification.

The binder resin prepared according to the present invention is the product of the condensation reaction of at least one naphthalenic compound, at least one phenolic compound, and formaldehyde. The resin formed is a polymeric structure of randomly aligned units which may be represented as follows:

with the proviso that (d+e) is greater than zero.

The phenolic compound, which may be one or a mixture of phenolic compounds, can be represented by the general formula

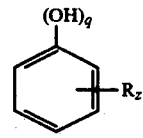

wherein q and z are as defined above, and preferably each R independently is an aliphatic group having from 1 to 20 carbon atoms, and more preferably R is an aliphatic group having 4 to 15 carbon atoms or z is equal to zero, and most preferably, where there is a mixture of phenolic compounds, one is unsubstituted phenol.

Suitable R-containing phenols for this purpose include those having straight or branched chain or cyclic alkyl groups selected from methyl, ethyl, propyl, butyl, amyl, hexyl, cyclohexyl, heptyl, octyl, nonyl, decyl, undecyl, dodecyl, tridecyl, tetradecyl, pentadecyl, hexadecyl, heptadecyl, octadecyl, nonadecyl, eicosanyl, vinyl, propenyl, butenyl, pentenyl, hexenyl, cyclohexenyl, heptenyl, octenyl, nonenyl, decenyl, undecenyl, dodecenyl, tridecenyl, tetradecenyl, pentadecenyl, heptadecenyl, octadecyl, nonadecyl, and eicosenyl.

Specifically useful and available substituted phenols include tert-butylphenol, tert-amylphenol, tert-octylphenol, nonylphenol, dodecylphenol, and cashew nutshell liquid.

Suitable di- and trihydroxybenzenes for this purpose include those wherein R is as disclosed for phenols above. Useful and available resorcinols include ethylresorcinol, propylresorcinol, butylresorcinol, hexylresorcinol, heptylresorcinol, and dodecylresorcinol, and CNSL.

Commercially available technical grade naphthalenes (as used herein "naphthalene" or "naphthalenic compound") includes mixed streams of substituted naphthalenes which may be employed without any purification steps to produce the defined resin binder.

The napthalene compound may be represented by the general formula

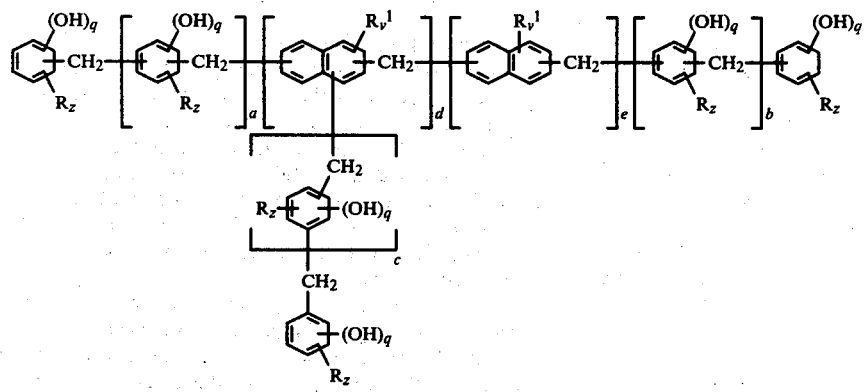

wherein a, b, c, d, and e are integers having a value of 0 to 1000,
q is 1, 2 or 3,
v is 0, 1, 2, or 3, and
z is 0, 1, or 2,

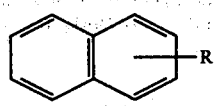

wherein v is as defined above and preferably each $R^1$ independently is an aliphatic group having from 1 to 15 carbon atoms, or is a halo group, and most preferably $R^1$ is an aliphatic group having 1 to 12 carbon atoms or v is equal to zero.

Suitable $R^1$ containing naphthalenes for this purpose include those wherein each $R^1$ is independently a straight or branched chain or cyclic aliphatic group selected from methyl, ethyl, propyl, butyl, amyl, hexyl, cyclohexyl, heptyl, octyl, nonyl, decyl, undecyl, dodecyl, tridecyl, tetradecyl, pentadecyl, vinyl, propenyl, butenyl, pentenyl, hexenyl, cyclohexenyl, heptenyl, octenyl, nonenyl, decenyl, undecenyl, dodecenyl, tridecenyl, tetradecenyl, and pentadecenyl.

Specifically useful and available substituted naphthalenes include isomers of the following: methylnaphthalene, dimethylnaphthalene, ethylnaphthalene, isopropylnaphthalene, butylnaphthalene, amylnaphthalene, diamylnaphthalene, nonylnaphthalene, dinonylnaphthalene, vinylnaphthalene, chloronaphthalene, dichloronaphthalene, and bromonaphthalene.

Two methods for preparing the binder resins of the present invention are:

(1) Crosslinkable phenolic capped hydroxymethylated oligomers of naphthalenic compounds, wherein the phenolic and naphthalenic compounds are as described above, are prepared. In this reaction the lower reactivity of the naphthalenic material is circumvented by first reacting one or more naphthalenic compounds to form hydroxymethyl substituted oligomers, before introduction of the capping reactant. The first step of the reaction is carried out with an acidic catalyst, for example, sulfuric acid, under non-dehydrating conditions. One mole of naphthalenic component is treated with at least one mole of formaldehyde at a temperature of 70°–120° C. for 1–10 hours. A convenient method of controlling the temperature involves use of a water based solvent which boils at a suitable temperature (i.e., 70°–120° C.). The aqueous water phase, including any unreacted excess formaldehyde and acid, is removed before proceeding to the next reaction step.

In the second step of the reaction, at least one phenolic compound as defined above is added to react with the hydroxymethyl naphthalenic oligomer formed in the first step to complete the resin formation. The quantity of phenolic reactant to be added varies from 0.8–5 moles of reactant per mole of naphthalenic reactant originally used. As the amount of phenolic reactant is decreased relative to the amount of naphthalenic material, the molecular weight of the resin is increased. The phenolic addition step may be done under either acid or base catalysis (e.g., mineral acid, NaOH) and may be done under dehydrating conditions such as azeotropic distillation, vacuum distillation, or ordinary distillation. The temperature range for this reaction preferably is 100°–200° C. It is convenient to observe water evolution as a means of monitering this reaction, which typically takes place in 0.5 to 10 hours depending on temperature. The level of unreacted monomeric phenolic reactant in the final resin may be further controlled by addition of more formaldehyde and repeating the dehydration procedure.

(2) Cross-linkable phenolic capped hydroxymethylated naphthalenic oligomers are prepared. In the first step of the reaction one or more naphthalenic compound is reacted with formaldehyde under acid catalysis and dehydrating conditions to form a linear or branched oligomer. The average length of the oligomer chain is controlled by the ratios of the naphthalenic component to the formaldehyde, which can be 1:1 or lower. As the ratio is decreased, the oligomer chain is lengthened. Naphthalenic oligomers suitable for use in the practice of this invention can be made with naphthalenic compound:formaldehyde ratios of about 1:1–10, preferably 1:1–5, and most preferably 1:1–4. The first step is carried out with acid catalysis under dehydrating conditions at 80°–150° C. for 0.5–20 hours. It is convenient to mix the reactants with a solvent such as heptane and use azeotropic distillation to remove the water which is generated. By this method, the extent of the reaction is also easily ascertained.

In the reaction second step the hydroxymethylated naphthalenic oligmer is capped with the phenolic reactant. The molar amount of phenolic material should be from 0.8 to 5 moles based on the starting amount of naphthalenic material. As the ratio of phenolic to naphthalenic material increases lower molecular weight reaction product will be obtained. The reaction can be carried out with acidic or basic catalysis (e.g., mineral acid or alkali base), at a temperature of 100°–200° C. for 0.5 to 10 hours depending on temperature, under dehydrating conditions such as distillation, azeotropic distillation, or vacuum distillation. The level of unreacted phenolic material in the final resin may be controlled further by addition of formaldehyde and repeated dehydration.

The resins of the present invention are useful in preparation of vehicle or machinery parts. These resins also find use as friction modifying particles used in friction articles as stated above. Other uses of these resins are as binder compositions for abrasive articles. Brake linings made according to the present invention exhibit unexpectedly high coefficients of friction of about 0.3 or higher even at temperatures up to 485° C. and show significantly less increase in pedal effort for consecutive stops than friction elements (e.g., clutches, brake linings, disc pads) made employing conventional binding systems.

Objects and advantages of this invention are further illustrated by the following examples, wherein all parts are by weight, unless otherwise specified, but the particular materials and amounts thereof recited in these examples, as well as other conditions and details, should not be construed to unduly limit this invention. All viscosities are determined at 25° C. using a Brookfield Viscometer, model RVT or LVT, Brookfield Engineering Laboratories, Inc., Stoughton, MA, using procedures known in the art.

Examples 1–15 describe preparations of binder compositions according to the present invention. Examples 1–13 and 15 illustrate the first binder resin preparation method, while Example 14 illustrates the second method. Example 16 illustrates the preparation of a friction particle.

Examples C1 to C8 describe control binder compositions of the type known for use in prior art friction elements. Formulations A through E describe general formulations suited to the preparation of friction elements. Friction elements made according to the invention (i.e., with resin Examples 1-15 and particle Example 16) or according to the prior art (i.e., with Control Examples C1 to C8) with Formulations A-E are hereinafter identified as an example with both the resin example number and the formulation identification letter. That is, a friction element made with the resin of Example 1 according to Formulation A will be identified hereinafter as friction element Example "1A". Similarily, a friction element made with Control C1 resin and Formulation B will be identified as Example "C1B". The other friction elements are identified accordingly.

EXAMPLE 1

Water [37.3 kg, (82 lb)], sulfuric acid [98%, 33.6 kg, (74 lb)], and paraformaldehyde [92%, 40.5 kg, (89 lb)] were mixed and heated to 100° C. to dissolve the paraformaldehyde. Naphthalene [45.5 kg, (100 lb)] was added and the mixture heated for approximately 5 hours at 105° C. The water phase was removed, the organic layer was washed with water [218 kg, (480 lb)], and the unreacted naphthalene was removed by steam distillation. Toluene [36.4 kg, (80 lb)], phenol [66.8 kg, (147 lb)] and sulfuric acid [50% in water solution, 0.9 kg, (2 lb)] were added, the reaction mixture was heated to 110° C. and the water [8.2 kg, (18 lb)] removed by azeotropic distillation. Formalin [37% formaldehyde, 13.9 kg (30.5 lb)] and toluene [18.2 kg, (40 lb)] was added, and water [11.8 kg (26 lb)] was removed by azeotropic distillation. Toluene [40.9 kg (90 lb)] was removed by distillation. Isopropanol [4.5 kg (10 lb) and methylethylketone [6.8 kg (15 lb)] were added with stirring to produce a clear resin solution, 79 percent solids, viscosity 23,500 cps.

EXAMPLE 2

The resin from Example 1 (1.5 kg) was heated to 130° C. to remove the solvents (toluene, isopropanol, methylethylketone) by distillation. After several hours with aspirator vacuum applied, the resin was cooled slightly and a vacuum pump employed for approximately one hour. The resin was cooled and the solid was ground.

EXAMPLE 3

Water (525 g), sulfuric acid (98% in water solution, 475 g), and paraformaldehyde (flaked, 92% formaldehyde, 570 g) were mixed and heated to 100° C. to dissolve the paraform. Naphthalene (640 g) was added and the reaction was refluxed for approximately 5 hours. The water phase was removed, water (200 g) and sodium hydroxide solution (25%, 240 cc) were added, and phenol (940 g) was added with mild exotherm. The water phase was removed, and toluene (100 cc) was added. The reaction was heated to 100° C. and water (150 cc) was removed by azeotropic distillation. Methylethylketone (45 cc) was added to produce a clear resin. Half of the reaction mixture was removed as a liquid binder resin.

EXAMPLE 4

The remainder of the reaction mixture in Example 3 was heated at 100° C. and water (100 cc) was removed by azeotropic distillation. The solid resin product was pulverized.

EXAMPLE 5

A binder system containing 75% (based on resin solids) of the resin from Example 1 and 25% (based on resin solids) of an acid-bodied CNSL resin, Control Example C1 below (available under the trade designation Cardolite ® NC-311, 3M Company), was prepared by physically blending the two components.

EXAMPLE 6

A binder system containing 50% (based on resin solids) of the resin from Example 1 and 50% (based on resin solids) of an acid-bodied CNSL resin, Control Example C1 below (Cardolite NC-311), was prepared by physically blending the two components.

EXAMPLE 7

A binder system containing 25% (based on resin solids) of the resin from Example 1 and 75% (based on resin solids) of an acid-bodied CNSL resin, Control Example C1 below (Cardolite NC-311), was prepared by physically blending the two components.

EXAMPLE 8

Water (2.6 kg), sulfuric acid (98%, 2.4 kg), and paraformaldehyde (flaked, 92%, 2.9 kg) were mixed and heated to dissolve the paraformaldehyde. Naphthalene (3.2 kg) was added and the reaction mixture was refluxed 5 to 15 hours. Isopropanol (200 cc) was added to facilitate the phase separation. The water phase was removed, and the organic phase was washed with water (1500 cc) and isopropanol (200 cc) to produce a viscous resin intermediate.

EXAMPLE 9

The resin intermediate from Example 8 (700 g) was warmed to 70° C., toluene (165 g) and raw cashew nut shell liquid (1.2 kg) were added. The reaction mixture was held at a maximum temperature of 105° C. and water (97 g) was removed by azeotropic distillation over approximately 5 hours. Toluene (250 g) was added and additional water (18 g, total 113 g) was removed by azeotropic distillation to give a clear liquid binder resin, 76 percent solids, viscosity 11,600 cps.

EXAMPLE 10

The resin intermediate from Example 8 (700 g) was warmed to 65° C., and toluene (165 g), raw cashew nut shell liquid (862.5 g) and phenol (235 g) were added. The reaction mixture was heated at 92°-110° C. for a period of approximately 5½ hours and water (149 g) was removed by azeotropic distillation. Toluene (220 g) was added and additional water (29 g) was removed by azeotropic distillation over a 1 hour period to produce a clear liquid binder resin, 79 percent solids, viscosity 24,400 cps.

EXAMPLE 11

The resin intermediate from Example 8 (700 g) was warmed to 60° C., and toluene (165 g), raw cashew nut shell liquid (575 g) and phenol (470 g) were added. The reaction mixture was heated at 98°-114° C. over a period of approximately 9 hours and water (140 g) was removed by azeotropic distillation. Toluene (200 g) was added and additional water (36 g, total 176 g) was removed by azeotropic distillation over a 30 minute period to produce a clear liquid binder resin, 75 percent solids, viscosity 22,900 cps.

EXAMPLE 12

The resin intermediate from Example 8 (700 g) was warmed to 60° C., and toluene (165 g), raw cashew nut shell liquid (287.5 g) and phenol (705 g) were added. The reaction mixture was heated at 96°–115° C. over a period of approximately five hours and water (174 g) was removed by azeotropic distillation. Toluene (173.5 g) was added and additional water (16 g, total 190 g) was removed by azeotropic distillation over a one hour period to produce a clear liquid binder resin, 67 percent solids, viscosity 4,000 cps.

EXAMPLE 13

The resin intermediate from Example 8 (700 g) was warmed to 52° C. and toluene (165 g), nonylphenol (575 g), and phenol (470 g) were added. The reaction mixture was heated at 97°–120° C. for a period of approximately 9 hours and water (160 g) was removed by azeotropic distillation. Toluene (200 g) was added, and Formalin (37% formaldehyde, 100 cc) added at 60° C. The reaction mixture was heated to 117° C. and additional water (110 g) was removed by azeotropic distillation to produce a clear liquid binder resin, 65 percent solids, 8000 cps.

EXAMPLE 14

Naphthalene (940 g), heptane (250 g), and phenolsulfonic acid (30 g) were mixed and heated to 65° C. Paraformaldehyde (flaked, 92%, 450 g) was added and the mixture refluxed at 100° C. for approximately 4½ hours and water (185 cc, containing formaldehyde) was removed by azeotropic distillation. A portion of the water formaldehyde solution (75 cc) was returned to the reaction and water (75 cc) was removed by azeotropic distillation. Heptane (200 cc), isopropanol (150 cc), phenolsulfonic acid (30 g), and paraformaldehyde (200 g) were added. Additional water (155 cc) was azeotropically removed and heptane (250 cc) was added. Phenol (1410 g) was added at 80° C. and the reaction mixture was heated at 100°–140° C. for approximately 12 hours while paraformaldehyde (flaked, 92%, 150 g), Formalin (37%, 304 g), toluene (450 cc), phenolsulfonic acid (65%, 1 cc), isopropanol (50 cc), and water (50 cc) were added, and additional water (412 cc) was removed by azeotropic distillation to produce a dark brown liquid binder resin.

EXAMPLE 15

Water (575 g), sulfuric acid (98%, 425 g), and paraformaldehyde (flaked, 92%, 570 g) were mixed and heated to dissolve the paraformaldehyde. Naphthalene (640 g) was added and the reaction mixture was refluxed at 105° C. for approximately 16 hours. The water phase was removed and phenol (460 g) was added with the reaction mixture at 85° C.; an exotherm was observed. Water was removed by distillation for approximately 7 hours at 105° C. to produce a clear solid binder resin which was pulverized.

EXAMPLE 16

The resin from Example 1 (76% solids, 125 g) was mixed with paraformaldehyde (powdered, 95%, 10 g), and was cured 16 hours at 177° C. The resulting solid was pulverized to the size which passes through a 40 mesh sieve.

Control Example C1—a liquid binder system containing acid-bodied cashew nut shell liquid [78–82% solids in mineral spirits, viscosity (diluted 250 parts of resin to 150 parts xylol) of 200–205 cps at 25° C., Cardolite ® NC-311, 3M].

Control Example C2—a liquid binder system containing heat and acid bodies cashew nut shell liquid (78–82% solids in toluene, viscosity 10,000–18,000 cps at 25° C., Cardolite ® NC-300, 3M).

Control Example C3—a powdered binder system containing cashew nut shell liquid modified phenolic resin (finely pulverized free-flowing powder containing sufficient hexamethylene tetramine to complete the cure, the resulting particles being capable of passing through a 200 mesh screen, Cardolite ® NC-126, 3M).

Control Example C4—a liquid binder resin containing a modified phenolic resin (78 to 82 percent solids in cellosolve and super high flash naphtha, viscosity 20,000 to 40,000 cps at 25° C., Cardolite ® NC-335, 3M).

Control Example C5—a binder system containing 75% (based on resin solids) of the resin from Example C4 and 25% (based on resin solids) of the resin from Example C1 which had been physically blended.

Control Example C6—a binder system containing 50% (based on resin solids) of the resin from Example C4 and 50% (based on resin solids) of the resin from Example C1 which had been physically blended.

Control Example C7—a binder system containing 25% (based on resin solids) of the resin from Example C4 and 75% (based on resin solids) of the resin from Example C1 which had been physically blended.

Control Example C8—friction particles, the size which passes through 40 mesh sieve, which had been prepared by grinding fully cured cashew nut shell liquid polymer (Cardolite ® NC-104-40, 3M).

PREPARATION OF FRICTION MATERIAL

The binder compositions described above as Examples 1–16 and Control Examples C1 to C8 were utilized to prepare friction elements according to the present invention. The friction elements were prepared using conventional formulations and conventional methods. Five such formulations are set forth below respectively as Formulations "A", "B", "C", "D", and "E".

| Formulation A | |
|---|---|
| Ingredients | Parts |
| Resin solids | 20 |
| Asbestos fibers 7D or 7M (Johns Mansville, Denver, CO) | 60 |
| Barium sulfate, technical grade powdered | 20 |
| Hexamethylene tetramine | 2 |

The ingredients were mixed in a Baker-Perkins Sigma-Type Mixer (Baker-Perkins Co., Saganaw, MI) for approximately 30 minutes, then pressed at 140.6 kg/cm$^2$ (2000 psi) into flat discs approximately 10.0 cm (4.0 inches) in diameter and about 1.3 cm (0.5 inch) thick. These discs were dried for 24 hours at 21° C. to remove solvent and then cured in a cam-programmed air circulating oven with a uniformly constantly rising temperature over an 8 hour period from 38° to 149° C. (100° to 300° F.) and then heated at 149° C. for 4 hours and at 177° C. (350° F.) for an additional 4 hours.

| Formulation B | |
|---|---|
| Ingredients | Parts |
| Asbestos fiber, 7D or 7M | 60 |
| Barium sulfate, technical grade powdered | 20 |
| Resin solids | 19 |

-continued

| Formulation B | |
|---|---|
| Ingredients | Parts |
| Hexamethylene Tetramine | 1 |

The ingredients were mixed in a Patterson-Kelley Vee blender (Patterson-Kelley, E. Stroudsburg, PA) for 30 minutes, then was pressed for 15 minutes at 140.6 kg/cm$^2$ (2,000 psi) and 167° C. into flat discs approximately 10 centimeters in diameter and about 1.3 centimeters thick. These discs were further cured in an air circulating oven for 16 hours at 177° C.

Alternatively, the ingredients were mixed by continuously ball-milling for 30 minutes, then were pressed and cured as above.

| Formulation C | |
|---|---|
| Ingredients | Parts |
| Steel Fiber Beaver #2 | 30.0 |
| (James H. Rhodes, Chicago, IL) | |
| Barium Sulfate, technical grade powdered | 20.0 |
| Calcium carbonate | 10.0 |
| Aluminum oxide | 2.0 |
| Carbon Black | 0.5 |
| Superior Graphite, Coarse 9012 | 7.0 |
| (Superior Co., Chicago, IL) | |
| Superior Graphite, Medium 9018 | 5.0 |
| (Superior Co., Chicago, IL) | |
| Superior Graphite, Fine 9035 | 1.0 |
| (Superior Co., Chicago, IL) | |
| Hycar ® 1411 (finely divided powder-type nitrile rubber, nominal percent acrylonitrile 41%, B. F. Goodrich Co., Cleveland, OH) | 3.5 |
| Friction particles the size which passes through 40 mesh sieve prepared by grinding fully cured cashew nut shell liquid polymer (Cardolite NC-104-40) | 6.0 |
| Hexamethylene Tetramine | 1.5 |
| Binder resin solids | 15.0 |

This formulation was employed to produce disc pads. The ingredients were mixed in a Baker-Perkins Sigma-Type Mixer for approximately 30 minutes, and the mass was then pressed at 140.6 kg/cm$^2$ (2,000 psi) into flat disc pads measuring approximately 13.7 centimeters by 5 centimeters by 1.5 centimeters thick. These discs were dried for 24 hours at 21° C. to remove solvent, and then cured in a cam-programmed air circulating oven with a uniformly constantly rising temperature over an 8-hour period from 38° C. to 149° C. and then heated at 149° C. for 4 hours and at 177° C. for an additional 4 hours.

| Formulation D | |
|---|---|
| Ingredients | Parts |
| Steel Fibers Beaver #2 | 30.0 |
| Barium Sulfate, technical grade powdered | 20.0 |
| Calcium carbonate | 10.0 |
| Aluminum oxide | 2.0 |
| Carbon Black | 0.5 |
| Superior Graphite, Coarse 9012 | 7.0 |
| Superior Graphite, Medium 9018 | 5.0 |
| Superior Graphite, Fine 9035 | 1.0 |
| Hycar 1411 | 3.5 |
| Friction particles the size which passes through a mesh sieve prepared by grinding fully cured cashew nut shell liquid polymer (Cardolite NC-104-40) | 6.0 |
| Hexamethylene Tetramine | |
| Binder resin solids | 15.0 |

This formulation was employed to produce disc pads. The ingredients were mixed in a Patterson-Kelley Vee blender for 30 minutes, then pressed for 15 minutes at 140.6 kg/cm$^2$ (2000 psi) and 167° C. into flat discs measuring approximately 13.7 centimeters by 5 centimeters by 1.5 centimeters thick. These discs were further cured in an air circulating oven for 16 hours at 177° C.

| Formulation E | |
|---|---|
| Ingredients | Parts |
| Asbestos fiber, 7D | 60 |
| Barium sulfate, technical grade powdered | 10 |
| Resin solids containing 95% CNSL modified phenolic resin and 5% hexamethylene tetramine (Cardolite NC-126) | 20 |
| Friction particles | 10 |

The ingredients were mixed by ball-milling for 30 minutes, and then the mass was pressed for 15 minutes at 140.6 kg/cm$^2$ (2000 psi) and 167° C. into flat discs approximately 10 centimeters in diameter about 1.3 centimeters thick. These discs were further cured in an air circulating oven for 16 hours at 177° C.

Testing Procedures

Testing was conducted on certain of the examples. Friction materials prepared as described were tested to determine their suitability as brake lining material, both in laboratory tests and in actual use tests.

Laboratory Testing

The laboratory testing involved two types of constant input testing and one type of constant output testing. The first constant input test was Society of Automotive Engineers (SAE) Brake Lining Quality Control Test Procedure J-661a of the Society of Automotive Engineers as set forth on pages 31.59–31.61 in Society of Automotive Engineer's Book, 1979, to determine the coefficient of friction under normal conditions (about 93° C./200° F.) and under conditions where the brake lining has been heated (usually about 293° C./560° F.) after continuous braking.

The results of such testing are shown in Table 1 below.

TABLE 1

| Example | Coefficient of Friction (normal) | Coefficient of Friction (hot) |
|---|---|---|
| 1A | 0.383 | 0.527 |
| 3A | 0.363 | 0.453 |
| C1A | 0.393 | 0.388 |
| C2A | 0.375 | 0.376 |
| C3B | 0.310 | 0.368 |
| C4A | 0.333 | 0.383 |
| 1C | 0.458 | 0.348 |
| 2D | 0.423 | 0.327 |
| 3C | 0.388 | 0.334 |
| 4D | 0.395 | 0.318 |
| C2C | 0.370 | 0.261 |
| C3D | 0.400 | 0.351 |
| C4C | 0.415 | 0.340 |
| C8E | 0.420 | 0.396 |

A useful friction element has a coefficient of friction of at least 0.30 both under normal conditions and under hot conditions.

The second constant input test was similar to SAE Standard Test J-661a. The test specimen was conditioned by running it at 312 rpm (4.6 mps, 15 fps) at 7 kg/cm² (100 psi) contact pressure and a maximum drum temperature of 93° C. (200° F.) for a minimum of 20 minutes to obtain at least 95% contact between the surface of the test sample and the drum. Thereafter, the sample initial thickness and weight were determined and the test begun. A base line was obtained by running the drum at 417 rpm for 10 seconds with a 10.5 kg/cm² (150 psi) load applied between the sample and drum surface and 20 seconds with the load removed for 20 on-off cycles. The test was then commenced at a drum temperature of 93° C.±10° C. (200° F.±20° F.), with this temperature limit being maintained throughout this portion of the test. The coefficient of friction was recorded every fifth application. The drum was then run continuously at 10.5 kg/cm² (150 psi) and 417 rpm with the drum heater activated and the drum cooling system deactivated, starting at 93° C. (200° F.) and running until 345° C. (650° F.) was obtained or until the coefficient of friction drops below 0.2, whichever occurred first, for the first "fade" run. During this time, temperature readings and frictional force readings were simultaneously noted at 14° C. (25° F.) intervals and the time required to reach each 56° C. (100° F.) interval and to reach 345° C. (650° F.) was noted.

Immediately following the completion of the first fade run, the first recovery run was carried out, wherein the drum heater was deactivated and the drum cooling was activated and a 10 second braking application at each 56° C. (100° F.) interval was made, while cooling from 315° C. (600° F.) to 93° C. (200° F.), while recording the coefficient of friction for each application. A second fade run was completed immediately following the first recovery run by deactivating the drum cooling and activating the drum heating and running the drum with a continuous drag at 10.5 kg/cm² (150 psi) and 417 rpm, starting at 56° C. (100° F.) and running for 20 minutes or until 482° C. (900° F.) was reached, whichever occurred first. The run was stopped if the coefficient of friction dropped below 0.2. Simultaneous friction force and drum temperature readings were taken at 14° C. (25° F.) intervals. The time to reach each 56° C. (100° F.) interval and the time to reach 482° C. (900° F.) was recorded. Immediately after completion of the second fade run, the heater was deactivated and cooling activated and a 10 second braking application was made at each 56° C. (100° F.) interval while cooling from 371° C. (700° F.) to 93° C. (100° F.).

Results of this testing are shown in Table II below. (Second fade results)

TABLE II

| Ex. | Coefficient of Friction | | | | Time (min) |
|---|---|---|---|---|---|
| | 316° C. (600° F.) | 371° C. (700° F.) | 427° C. (800° F.) | 482° C. (900° F.) | |
| 1A | 0.65 | 0.52 | 0.54 | 0.56 | 13.5 |
| 3A | 0.48 | 0.48 | 0.46 | 0.50 | 14.9 |
| 4B | 0.55 | 0.47 | 0.48 | 0.50 | 14.75 |
| 5A | 0.57 | 0.58 | 0.50 | 0.53 | 13.1 |
| 6A | 0.59 | 0.52 | 0.53 | 0.45 | 14.75 |
| 7A | 0.56 | 0.46 | <0.20 | — | 13.6 |
| 9A | 0.56 | 0.30 | <0.20 | — | 13.2 |
| 10A | 0.56 | 0.38 | <0.20 | — | 16.7 |
| 11A | 0.52 | 0.39 | 0.31 | 0.57 | 17.75 |
| 12A | 0.56 | 0.49 | 0.50 | 0.57 | 12.25 |
| 13A | 0.52 | 0.43 | 0.56 | 0.61 | 11.8 |
| 14A | 0.59 | 0.51 | 0.52 | 0.52 | 12.75 |
| 15B | 0.44 | 0.50 | 0.41 | <0.20 | 20.00 |
| 16E | 0.45 | 0.43 | 0.37 | 0.35 | 18.2 |
| C1A | 0.51 | 0.20 | <0.20 | — | 9.6 |
| C2A | 0.30 | <0.20 | — | — | 12.4 |

TABLE II-continued

| Ex. | Coefficient of Friction | | | | Time (min) |
|---|---|---|---|---|---|
| | 316° C. (600° F.) | 371° C. (700° F.) | 427° C. (800° F.) | 482° C. (900° F.) | |
| C3B | 0.36 | 0.43 | 0.38 | 0.44 | 18.0 |
| C4A | 0.44 | 0.49 | 0.44 | 0.50 | 15.3 |
| C5A | 0.52 | 0.47 | 0.36 | 0.51 | 16.8 |
| C6A | 0.56 | 0.44 | <0.20 | — | 11.2 |
| C7A | 0.52 | 0.38 | <0.20 | — | 9.8 |
| C8E | 0.31 | 0.24 | <0.20 | — | 14.6 |
| C2C | 0.27 | 0.21 | <0.20 | — | 13.5 |
| C3D | 0.30 | 0.24 | <0.20 | — | 18.2 |
| C4C | 0.29 | 0.28 | 0.26 | <0.20 | 21.0 |

The constant output test, designated Friction Assessment Screening Test (FAST), is widely used in the industry. The test involved contacting a sample against a disc running at constant speed at a force which was varied to produce a constant drag. The test results revealing the maximum and minimum coefficient of friction and the sample wear are reported in Table III below.

TABLE III

| Ex. | Coefficient of Friction | | Wear | |
|---|---|---|---|---|
| | (Max.) | (Min.) | $10^{-1}$ cm³ HP-hours | $10^{-3}$ in³ HP-hours |
| 1A | 0.60 | 0.35 | 3.44 | (21.3) |
| 3A | 0.50 | 0.32 | 3.44 | (21.3) |
| 4B | 0.55 | 0.42 | 2.59 | (16.0) |
| 5A | 0.68 | 0.36 | 3.48 | (21.5) |
| 6A | 0.65 | 0.45 | 2.46 | (15.2) |
| 7A | 0.60 | 0.45 | 1.57 | (9.7) |
| 9A | 0.62 | 0.45 | 1.52 | (9.4) |
| 10A | 0.52 | 0.40 | 1.68 | (10.4) |
| 11A | 0.55 | 0.42 | 1.67 | (10.3) |
| 12A | 0.57 | 0.31 | 2.46 | (15.2) |
| 13A | 0.58 | 0.38 | 1.88 | (11.6) |
| 14A | 0.60 | 0.35 | 3.77 | (23.3) |
| 15A | 0.55 | 0.30 | 2.62 | (16.2) |
| 16E | 0.50 | 0.33 | 2.49 | (15.4) |
| C1A | 0.60 | 0.50 | 1.60 | (9.9) |
| C2A | 0.50 | 0.37 | 1.29 | (8.0) |
| C3B | 0.47 | 0.20 | 2.55 | (15.8) |
| C4A | 0.45 | 0.32 | 2.67 | (16.5) |
| C5A | 0.62 | 0.44 | 1.89 | (11.7) |
| C6A | 0.58 | 0.46 | 2.17 | (13.4) |
| C7A | 0.62 | 0.49 | 1.57 | (9.7) |
| C8E | 0.55 | 0.32 | 2.16 | (13.4) |
| 1C | 0.32 | 0.28 | 0.32 | (2.0) |
| 2D | 0.43 | 0.32 | 0.15 | (0.9) |
| 3C | 0.37 | 0.31 | 0.24 | (1.5) |
| 4D | 0.42 | 0.33 | 0.19 | (1.2) |
| C2C | 0.43 | 0.31 | 0.23 | (1.4) |
| C3D | 0.40 | 0.33 | 0.29 | (1.2) |
| C4C | 0.39 | 0.27 | 0.53 | (3.3) |

Actual Use Test

In an actual use test, the friction materials described above were employed as disc pads for the front wheels of a stock 1977 Oldsmobile Cutlass Sedan. The currently used test as described in Federal Motor Vehicle Safety Standard No. 105-75, often referred to as (F)MVSS-105-75, (Code of Federal Regulations, Title 49, Parg 571, effective Jan. 1, 1976, for passenger cars) was run to determine the efficiency of the disc pads at various temperatures. Testing in the heating mode is called the "fade" test. Testing in the cooling mode is called the "recovery" test. During each part of the test, a number of stops were made at defined deceleration rates and the pedal effort as evidenced by line pressure were recorded.

The test provides for 10 preburnishing stops; a first effectiveness test at 48 km (30 miles) per hour and 96 km (60 miles) per hour; 200 burnishing stops; a second effectiveness test at 48 km (30 miles) per hour, 96 km (60 miles) per hour, and 120 km (80 miles) per hour; a first fade test of 10 stops from 96 km (60 miles) per hour; a first recovery test of 5 stops from 48 km (30 miles) per hour; 35 reburnishing stops; a second fade test of 15 stops from 96 km (60 miles) per hour; a second recovery of 5 stops from 48 km (30 miles) per hour; 35 reburnishing stops; and a third effectiveness at 48 km (30 miles) per hour, 96 km (60 miles) per hour, and 120 km (80 miles) per hour. Wear is measured as the difference in thickness of the pads from the start to the conclusion of the test.

The results are reported in Table IV below.

TABLE IV

| | Fade 2 | | Recovery 2 | | | |
|---|---|---|---|---|---|---|
| | Maximum Line Pressure | Number of Stops to Maximum Line Pressure | Maximum Line Pressure | Number of Stops to Maximum Line Pressure | Wear | |
| Ex. | kg/cm² (psi) | | kg/cm² (psi) | | $10^{-3}$ cm | $(10^{-3}$in) |
| 1C | 47.8(680) | 1 | 29.5(420) | 1 | 152 | (60) |
| 3C | 45.0(640) | 14 | 38.7(550) | 4 | 185 | (73) |
| 4D | 50.6(720) | 9 | 31.6(450) | 1 | 79 | (31) |
| C2C | test failed | | | | | |
| C3D | 67.5(960) | 11 | 52.7(750) | 1 | 69 | (27) |
| C4C | 45.7(650) | 1 | 30.9(440) | 3 | 155 | (61) |

Various modifications and alterations of this invention will become apparent to those skilled in the art without departing from the scope and spirit of this invention, and it should be understood that this invention is not to be unduly limited to the illustrative embodiment set forth herein.

I claim:

1. A composition of matter heat stable to at least 371° C. comprising a physical blend of
   a. 10 to 95 weight percent, based on resin solids, of a curable resin which is the acid-catalyzed reaction product of
      (1) at least one phenolic compound having the formula

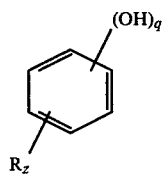

wherein each R independently represents an aliphatic group of 1 to 20 carbon atoms, or an aryl group having 6 to 12 carbon atoms, g is 1, 2, or 3, and z is 0, 1, or 2;
      (2) at least one naphthalenic compound having the formula

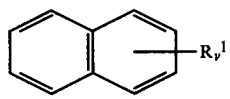

wherein each $R^1$ independently is a halo or an aliphatic group of 1 to 15 carbon atoms, and v is 0, 1, 2, and 3; and
      (3) formaldehyde;
the mole ratio of naphthalenic compound:phenolic compound:formaldehyde in said composition being in the range of 1:0.8-5:1-10,
   b. 5 to 90 weight percent, based on curable binder resin solids, of prior art resins selected from bodied cashew nut shell liquid resin, bodied linseed oil resin, oil-modified phenolic resins, and mixtures thereof.

2. The composition of matter according to claim 1 wherein said ratio of naphthalenic compound to phenolic compound to formaldehyde is 1:1-3:1-5.

3. The composition of matter according to claim 1 wherein said ratio of naphthalenic compound to phenolic compound to formaldehyde is 1:2-2:1-4.

4. The composition of matter according to claim 1 wherein R of said phenolic compound is an aliphatic group having 4 to 15 carbon atoms.

5. The composition of matter according to claim 1 wherein said phenolic compound is selected from unsubstituted phenol, tert-butylphenol, tert-amylphenol, tert-octylphenol, nonylphenol, dodecylphenol, and cashew nut shell liquid.

6. The composition of matter according to claim 1 wherein z of said phenolic compound is equal to zero.

7. The composition of matter according to claim 1 wherein q of said phenolic compound is equal to 1 and z is equal to 0.

8. The composition of matter according to claim 1 wherein said phenolic compound comprises a mixture of unsubstituted phenol and cashew nut shell liquid.

9. The composition of matter according to claim 1 wherein said phenolic compound comprises a mixture of unsubstituted phenol and nonylphenol.

10. The composition of matter according to claim 1 wherein said phenolic compound comprises a mixture of unsubstituted phenol and dodecylphenol.

11. The composition of matter according to claim 1 wherein $R^1$ of said naphthalenic compound is an aliphatic group having 1 to 12 carbon atoms.

12. The composition of matter according to claim 1 wherein v of said naphthalenic compound is equal to zero.

13. The composition of matter according to claim 1 wherein said prior art resin of said physical blend comprises bodied cashew nut shell liquid resin.

14. The composition of matter according to claim 1 wherein the prior art resin of said physical blend comprises bodied linseed oil resin.

15. A friction element having a cured organic thermosettable binder resin with filler dispersed and bonded therein, said binder resin comprising:
   a physical blend of
   a. 10 to 100 weight percent, based on resin solids, of a curable resin which is the acid-catalyzed reaction product of
      (1) at least one phenolic compound having the formula

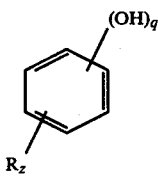

wherein each R independently represents an aliphatic group of 1 to 20 carbon atoms, or an aryl group having 6 to 12 carbon atoms, q is 1, 2, or 3, and z is 0, 1, or 2;

(2) at least one naphthalenic compound having the formula

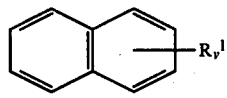

wherein each $R^1$ independently is a halo or an aliphatic group of 1 to 15 carbon atoms, and v is 0, 1, 2, or 3; and (3) formaldehyde; the mole ratio of naphthalenic compound:phenolic compound:formaldehyde in said composition being in the range of 1:0.8-5:1-10, b. 0 to 90 weight percent, based on curable binder resin solids, of prior art resins selected from cashew nut shell liquid binder resin, bodied linseed oil, oil-modified phenolic resins, and mixtures thereof, and c. 5 to 10 weight percent, based on curable binder resin solids of formaldehyde donor compounds.

16. A friction particle having a cured organic thermosettable binder resin and optionally having filler dispersed and bonded therein, said binder resin comprising:

a physical blend of
a. 10 to 100 weight percent, based on resin solids, of a curable resin which is the acid-catalyzed reaction product of
(1) at least one phenolic compound having the formula

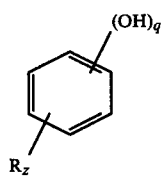

wherein each R independently represents an aliphatic group of 1 to 20 carbon atoms, or an aryl group having 6 to 12 carbon atoms,
q is 1, 2, or 3, and
z is 0, 1, or 2;
(2) at least one naphthalenic compound having the formula

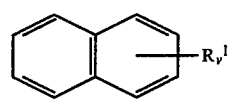

wherein each $R^1$ independently is a halo or an aliphatic group of 1 to 15 carbon atoms, and
v is 0, 1, 2, or 3; and (3) formaldehyde;
the mole ratio of naphthalenic compound:phenolic compound:formaldehyde in said composition being in the range of 1:0.8-5:1-10, b. 0 to 90 weight percent, based on curable binder resin solids, of prior art resins selected from cashew nut shell liquid binder resin, bodied linseed oil, oil-modified phenolic resins, and mixtures thereof, and c. 5 to 10 weight percent, based on curable binder resin solids of formaldehyde donor compounds.

17. A method of preparing a friction element comprising the steps of:
a. admixing
(1) a curable organic thermosettable binder resin, said resin comprising a physical blend of
(a) 10 to 100 weight percent, based on resin solids, of the curable acid-catalyzed reaction product of
(i) at least one phenolic compound having the formula

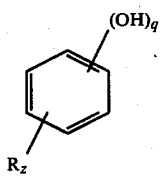

wherein each R independently represents an aliphatic group of 1 to 20 carbon atoms, or an aryl group having 6 to 12 carbon atoms, q is 1, 2, or 3, and z is 0, 1, or 2;
(ii) at least one naphthalenic compound having the formula

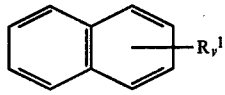

wherein each $R^1$ independently is a halo or an aliphatic group of 1 to 15 carbon atoms, and v is 0, 1, 2, or 3; and (iii) formaldehyde
the mole ratio of naphthalenic compound:phenolic compound:formaldehyde in the resin being in the range of 1:0.8-5:1-10, (b) 0 to 90 weight percent, based on curable binder resin solids, of prior art resins selected from bodied cashew nut shell liquid resin, bodied linseed oil, oil-modified phenolic resins, and mixtures thereof, and (c) 5 to 10 weight percent, based on curable binder resin solids, of formaldehyde donor compounds, and (2) a filler material, and b. forming the mixture into the desired shape, and
c. curing said binder resin.

18. A composition of matter comprising a physical blend of
a. 10 to 95 weight percent, based on resin solids, of a curable resin which is the acid-catalyzed reaction product of (1) at least one phenolic compound having the formula

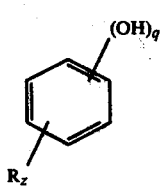

wherein each R independently represents an aliphatic group of 1 to 20 carbon atoms, or an aryl group having 6 to 12 carbon atoms, q is 1, 2, or 3, and z is 0, 1, or 2;

(2) at least one naphthalenic compound having the formula

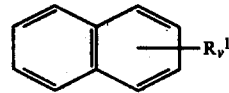

wherein each $R^1$ independently is a halo or an aliphatic group of 1 to 15 carbon atoms, and v is 0, 1, 2, or 3; and (3) formaldehyde; the mole ratio of naphthalenic compound:phenolic compound:formaldehyde in said composition being in the range of 1:0.8-5:1-10;

said resin being a polymeric structure of randomly aligned units having the structure:

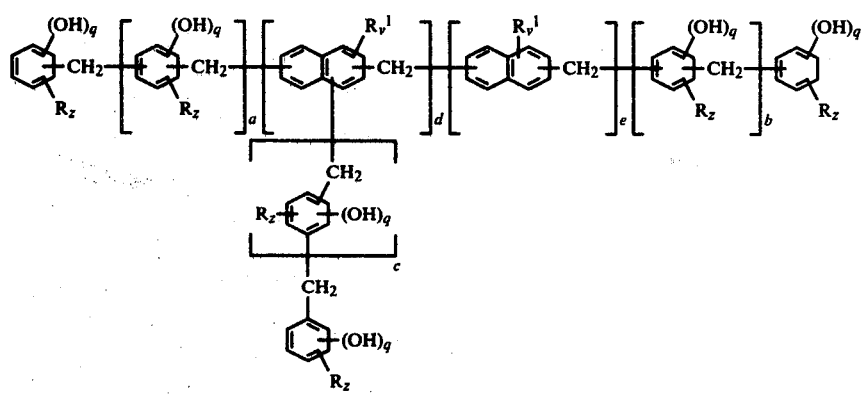

wherein a, b, c, d, and e are integers having a value of 0 to 1000; q, v, and z are as defined above, with the proviso that (d+e) is greater than zero; and b. 5 to 90 weight percent, based on curable binder resin solids, of prior art resins selected from bodied cashew nut shell liquid resin, bodied linseed oil resin, and mixtures thereof.

* * * * *

UNITED STATES PATENT AND TRADEMARK OFFICE
CERTIFICATE OF CORRECTION

PATENT NO. : 4,395,498
DATED : July 26, 1983
INVENTOR(S) : Judith L. Benham

It is certified that error appears in the above-identified patent and that said Letters Patent is hereby corrected as shown below:

Col. 3, line 25 (p. 5, line 8)
new paragraph at U.S. Pat. number

Col. 3, line 65 (p. 6, line 1)
$R_V^1$ should be $R^1{}_V$

Col. 5, line 46 (p. 9, line 1)
$R_V^1$ should be $R^1{}_V$

Col. 7, line 1 (p. 10, line 26)
$R_V^1$ should be $R^1{}_V$

Col. 17, line 65
$R_V^1$ should be $R^1{}_V$

Col. 18, line 20
1:2-2:1-4 should be 1:1-2:1-4

Col. 19, line 15
$R_V^1$ should be $R^1{}_V$

Col. 19, line 65
$R_V^1$ should be $R^1{}_V$

Col. 20, line 40
$R_V^1$ should be $R^1{}_V$

Col. 22, line 1
$R_V^1$ should be $R^1{}_V$

Signed and Sealed this

Twenty-third Day of October 1984

[SEAL]

Attest:

*Attesting Officer*

GERALD J. MOSSINGHOFF
*Commissioner of Patents and Trademarks*